Dec. 22, 1953     H. L. HARMS     2,663,355
SEAT SUPPORT

Filed Sept. 20, 1947

Inventor
Herman L. Harms
By Robert M. Dunning

Patented Dec. 22, 1953

2,663,355

UNITED STATES PATENT OFFICE 2,663,355

SEAT SUPPORT

Herman L. Harms, South St. Paul, Minn.

Application September 20, 1947, Serial No. 775,245

2 Claims. (Cl. 155—51)

My invention relates to an improvement in seat support and deals particularly with a type of support useful on tractors and other vehicles.

Tractor seats are usually supported by means of a spring arm or similar structure which allows a certain amount of spring action as the tractor passes over the rough ground. Most seat supports in common use produce a severe spring reaction when the seat is depressed. In some instances rebound checking devices are provided to prevent the return movement of the seat to normal position faster than is desired.

It is the object of the present invention to provide a seat support comprising a parallel link mechanism with a tension spring mounted diagonally across opposite corners thereof. Thus as the mechanism is actuated the seat is maintained at a constant angle and does not disturb the balance of the tractor operator.

A feature of the present invention lies in the provision of a parallel linkage having a diagonal spring as previously described. As the seat moves downwardly the spring elongates tending to return the seat to normal elevated position. At the same time, however, the axis of the spring moves closer to the adjacent pivot center line diagonally across the linkage, thus tending to retard any severe spring reaction.

A feature of the present invention lies in the provision of a linkage which tends to maintain the operator in a level position. While opposite sides of the seat support are connected together, the connections and pivots are sufficiently free to allow one side of the support to be depressed a greater distance than the other side thereof. As a result when one side of the tractor drops the operator tends to shift his weight toward the opposite side of the tractor, thus depressing the spring support on the opposite side of the tractor and tending to hold the operator in a level position.

These and other objects and novel features of my invention will be more clearly and fully set forth in the following specification and claims.

In the drawings forming a part of my specification:

Figure 1:
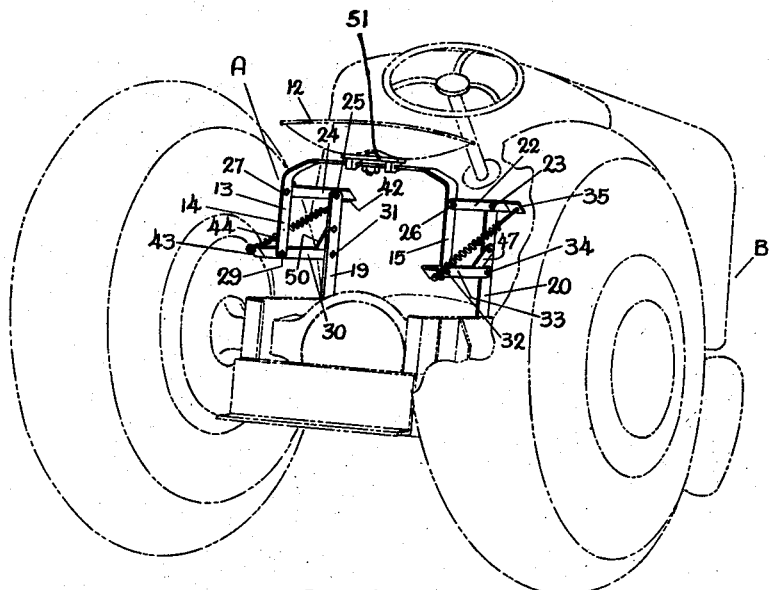
Figure 1 is a perspective view of a tractor showing my seat support in place thereupon.
Figure 2:
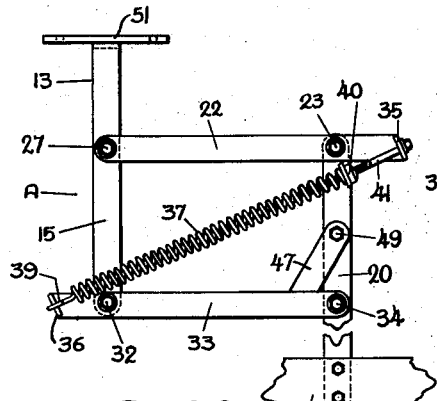
Figure 2 is a side elevational view of my seat support.
Figure 4:
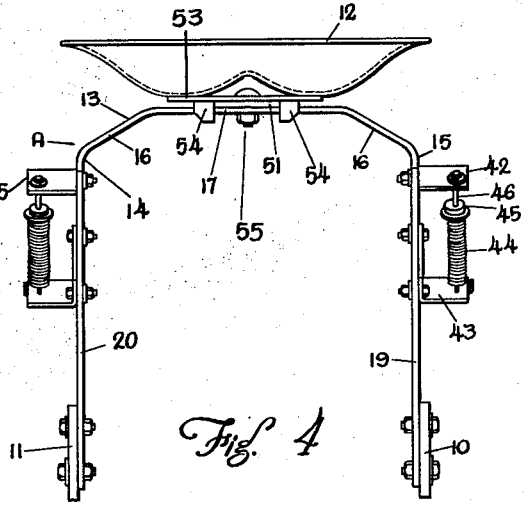
Figure 4 is a rear elevational view of my seat support.
Figure 3:
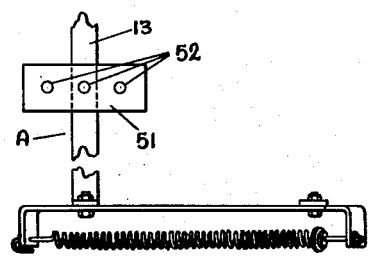
Figure 3 is a top plan view of one side of my seat support showing the construction thereof.

My seat support A may be used for any desired purpose but is particularly designed for use on a tractor or similar vehicle designed to travel over rough ground. Accordingly in Figure 1 of the drawings the seat support A is shown attached to a tractor B for supporting the tractor operator. The tractor B is provided with a pair of parallel frame members 10 and 11 to which the seat support is attached, as best illustrated in Figures 2 and 4 of the drawings. The seat itself, identified by the numeral 12, is attached to the upper end of the seat support A in any convenient manner. The seat support A includes a generally U-shaped bracket 13 which is supported in inverted position. The member 13 includes a pair of substantially parallel side arms 14 and 15 which are connected by angularly inclined bracket portions 16 to a transversely extending top connecting member 17 forming the base of the U.

A pair of parallel supporting arms 19 and 20 are bolted to the tractor frame members 10 and 11. The intermediate portion of each of these vertical arms is pivotally connected to a link connecting the supporting arm to the U-shaped bracket 13. A link 22 is pivotally connected at 23 to the upper extremity of the arm 20. The pivotal connection 23 is positioned at a point spaced from the forward end of the link 22. A link 24, similar to the link 22, is pivotally connected to the supporting arm 19 at a pivot point 25. The pivot point 25 is spaced from the forward end of the link 24. Pivots 26 and 27 connect the rear ends of the links 22 and 24, respectively, to the opposite sides 15 and 14 of the U-shaped bracket 13.

The lower end of the bracket side 14 is pivotally connected at 29 to a link 30. The pivot 29 is spaced forwardly from the rear end of the link. The forward end of the link 30 is pivotally connected at 31 to the supporting arm 19. The spacing of the pivots 25, 27, 29 and 31 is such that the links 24 and 30 are arranged in parallel relation. Furthermore, the spacing between the pivots 25 and 27 is equal to the spacing between the pivots 29 and 31 so that the links 24 and 30 remain constantly in parallel relationship.

The lower end of the bracket side 15 is pivotally connected at 32 to a link 33. The link 33 is pivotally connected at 34 to the vertical arm 20. The links 22 and 33 are in parallel relation and the spacing between the respective pivots is such as to hold these links constantly parallel.

The forward end 35 of the link 22 is bent transversely and angularly so that the flat side thereof is substantially normal to a diagonal line connecting the front end of the link 22 to the rear end of the link 33. The rear end 36 of the link 33 is bent parallel to the link end 35 as best illustrated in Figure 2 of the drawings. A spring 37 has one end 39 connected to the end 36 of the link 33. A spring anchor 40 is provided at the other end of the spring 37 and an adjustment bolt 41 extends through the link end 35 and is adjustably connected to the spring anchor. By rotating the anchor bolt 41 the tension of the spring 37 may be adjusted.

The forward end 42 of the link 24 is bent outwardly into parallel relation with the outturned end 43 of the link 30. A spring 44 is anchored to the arm end 43 and is provided with a spring anchor 45 at its other end. An anchor bolt 46 extends through the link end 42 and is adjustably secured to the anchor 45. As a result the tension of the spring 44 may be adjusted by rotating the anchor bolt 46.

A stop arm 47 is adjustably secured on arm 20 by a bolt 49 or other suitable means. This arm 47 may be rotated about the bolt 49 so as to hold the arm 47 in adjusted position. A similar stop arm 50 is connected to the supporting arm 19. The lower ends of the stop arms 47 and 50 engage against the links 33 and 30, respectively, to limit pivotal movement of these links in one direction.

A plate 51 is welded or otherwise transversely affixed to the central portion 17 of the U-shaped bracket 13. This plate 51 is provided with spaced apertures 52 therein to which the seat 12 may be bolted. The seat 12 is provided with a plate 53 attached thereto and having lugs 54 projecting downwardly therefrom for engagement with opposite sides of the plate 51. The lugs 54 hold the seat from rotation about its vertical pivot, while the bolt or bolts 55 extend through the plate 53 and the plate 51 to hold the seat in adjusted position.

In the preferred form of construction of my seat support the various links are provided with bushings or bearings therein to fit about the various pivot bolts. The pivot bolts are sufficiently loose in their bearings to permit a certain amount of angularity between opposite sides of the seat support. Similarly the supporting members are of sufficiently flexible material to permit a certain amount of distortion without permanent bending. As a result one side of the seat support may be depressed a substantial distance below the other when necessary so as to compensate for lateral angularity of the tractor or other supporting device.

It will be noted that as weight upon the seat is increased or as the supporting device passes over a bump, the seat is depressed. The sides of the U-shaped bracket 13 maintain parallel relation with the supporting arms 19 and 20 and the links on each side of the seat support remain parallel. However, the distance between the forward end of the upper links 22 and 24 and the rear ends of the lower links 33 and 30 increase as the seat moves downwardly. This action stretches the springs 37 and 44. However, it will also be noted that as the springs elongate the axes of the springs move closer to the adjacent pivots supporting the links. In other words as the seat moves downwardly the axis of the spring 37 moves toward the center line between the pivots 23 and 32 and the axis of the spring 44 moves toward a center line between the pivots 25 and 29. As a result the leverage of the springs decreases as the length thereof increases, tending to curb excessive spring reaction. As a result the tractor operator is returned gently to normal position after the unusual strain upon the springs is relieved.

In accordance with the patent statutes, I have described the principles of construction and operation of my seat support, and while I have endeavored to set forth the best embodiment thereof, I desire to have it understood that obvious changes may be made within the scope of the following claims without departing from the spirit of my invention.

I claim:

1. A seat support including a pair of upright supporting members, an inverted U-shaped bracket having sides in parallel relation to said upright members, a pair of links connecting each side of said bracket to a corresponding upright member, one end of each link being outturned, the outturned end of one link of each pair being at the end thereof attached to said upright support while the outturned end of the other link of each pair is at the end thereof secured to said bracket, and a spring connecting the outturned ends of the links of each pair.

2. A seat support comprising a substantially vertical fixed elongated member, upper and lower elongated members one above the other, first pivot means pivotally connecting the upper member to said fixed member, second pivot means pivotally connecting the lower member to said fixed member, another substantially vertical elongated member spaced from said fixed member, third pivot means pivotally connecting the upper member to said other substantially vertical member, fourth pivot means pivotally connecting said lower member to said other vertical member, the portions of said four elongated members lying between said pivots defining a parallelogram, and resilient means extending diagonally across the parallelogram and anchored to said upper and lower elongated members at points spaced from said first and fourth pivot means.

HERMAN L. HARMS.

References Cited in the file of this patent

UNITED STATES PATENTS

| Number | Name | Date |
|--------|------|------|
| 448,969 | Lloyd | Mar. 24, 1891 |

FOREIGN PATENTS

| Number | Country | Date |
|--------|---------|------|
| 731,473 | France | May 30, 1932 |
| 15,381 | Great Britain | of 1890 |
| 21,586 | Great Britain | of 1905 |